(12) United States Patent
Nielsen et al.

(10) Patent No.: US 8,551,218 B2
(45) Date of Patent: Oct. 8, 2013

(54) PROCESS AND SYSTEM FOR THE ABATEMENT OF IMPURITIES FROM A GAS STREAM

(75) Inventors: Poul Erik Højlund Nielsen, Fredensborg (DK); Roberta Cenni, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 790 days.

(21) Appl. No.: 12/539,506

(22) Filed: Aug. 11, 2009

(65) Prior Publication Data

US 2010/0037774 A1    Feb. 18, 2010

(30) Foreign Application Priority Data

Aug. 13, 2008    (DK) .................................. 2008 01093

(51) Int. Cl.
*B01D 53/48*    (2006.01)
*B01D 53/54*    (2006.01)

(52) U.S. Cl.
USPC ................................. 95/128; 95/133; 95/135

(58) Field of Classification Search
USPC .............. 95/128, 133, 135, 136; 96/121, 132; 423/230, 239.1, 244.01, 244.02, 423/244.04
See application file for complete search history.

(56) References Cited

U.S. PATENT DOCUMENTS

| | | | |
|---|---|---|---|
| 1,789,194 A * | 1/1931 | Rockwell | 423/236 |
| 3,111,387 A * | 11/1963 | Avery et al. | 95/103 |
| 3,878,289 A * | 4/1975 | Beavon | 423/219 |
| 4,263,020 A | 4/1981 | Eberly, Jr. | |
| 4,374,654 A | 2/1983 | McCoy | |
| 4,740,361 A * | 4/1988 | Heyd et al. | 423/210 |
| 5,944,878 A * | 8/1999 | Lindhe | 96/132 |
| 6,764,535 B1 * | 7/2004 | Lansbarkis et al. | 96/132 |
| 7,381,244 B2 * | 6/2008 | Tyndall et al. | 95/116 |
| 7,524,358 B2 * | 4/2009 | Saxena et al. | 95/118 |
| 7,833,316 B2 * | 11/2010 | Tatarchuck et al. | 95/135 |
| 7,892,328 B2 * | 2/2011 | Nakao et al. | 96/132 |
| 7,951,355 B2 * | 5/2011 | Dierickx et al. | 423/648.1 |
| 2006/0283780 A1 | 12/2006 | Spivey et al. | |
| 2007/0028773 A1 | 2/2007 | Jain et al. | |

FOREIGN PATENT DOCUMENTS

| | | |
|---|---|---|
| CA | 2453155 A1 | 6/2004 |
| EP | 320979 A2 | 6/1989 |
| WO | WO 2006/008317 A1 * | 1/2006 |
| WO | WO-2007/093225 A1 | 8/2007 |

* cited by examiner

*Primary Examiner* — Frank Lawrence, Jr.
(74) *Attorney, Agent, or Firm* — Dickstein Shapiro LLP

(57) ABSTRACT

A process for the abatement of carbonyl sulphide, carbon disulphide, metal carbonyl compounds, hydrogen sulphide and hydrogen cyanide, ammonia and arsenic and chlorine compounds from a feed gas comprising the steps of contacting the gas in succession with a first purification agent comprising activated carbon, with a second purification agent comprising alumina, with a third purification agent comprising zinc oxide, with a fourth purification agent comprising a zeolitic material and a fifth purification agent comprising zinc oxide and copper oxide.

12 Claims, No Drawings

PROCESS AND SYSTEM FOR THE ABATEMENT OF IMPURITIES FROM A GAS STREAM

BACKGROUND OF THE INVENTION

The present invention relates to a process and system for the abatement of impurities being contained in gas stream, in particular a gas stream being rich in hydrogen and carbon monoxide.

Hydrogen and carbon monoxide rich gas is commonly known as synthesis gas. Synthesis gas is a useful feed stock for the preparation of chemicals, including methanol, dimethyl ether, ammonia or the Fischer-Tropsch synthesis.

The preparation of synthesis gas from several sources like natural gas and naphtha by steam reforming is well known in the art. Lately, synthesis gas preparation by means of gasification of solid and liquid fuels, such as coal, pet-coke, biomass, and waste of various character, has attained increasing interest because of decreasing availability of natural gas and liquid hydrocarbon sources.

A problem with the use of synthesis gas prepared by gasification is the relatively high content of impurities, which have a poisonous effect on particular catalysts being employed in the subsequent conversion of the gas to chemicals.

The poisonous contaminants comprise mainly sulphurous compounds, particularly carbonyl sulphide, metal carbonyls, carbon disulphide and hydrogen sulphide together with hydrogen cyanide, ammonia and arsenic and chlorine compounds. These compounds poison catalysts with e.g. copper or zinc or zeolites as the catalytic active material in an irreversible manner by forming metal sulphides, cyanides, arsenides and chlorines.

To avoid serious poisoning of downstream catalysts the content of the contaminants in the synthesis gas has to be substantially reduced to the low ppb range, preferably below 10 ppb.

Bulk amounts of hydrogen sulphide in the synthesis gas are in industrial processes conventionally reduced down to the ppm range by washing processes with chemical or physical solvents, comprising the known Selexol and Rectisol process using organic compounds as physical solvents or amine wash processes employing alkanol amines as chemical solvents, like the monoethanol amine (MEA) and the methyldiethanol amine (MDEA) process.

Reduction of trace amounts of sulphurous compounds from gas streams is furthermore known in the art.

EP 320979A2 discloses desulphurization of a hydrocarbon stream to a sulphur content below 5 ppb by employing a copper-zinc desulphurizing agent.

Use of chromium, iron, cobalt, copper, cadmium, mercury or zinc alumina spinels as sorbent for the removal of hydrogen sulphide is known from U.S. Pat. No. 4,263,020.

Removal of carbonyl sulphide, hydrogen sulphide and hydrogen cyanide from a synthesis gas stream to less than 2 ppb in single guard bed with iron-oxide based material is discussed in WO 2007/093225. This document further discloses reduction of amounts of hydrogen cyanide, hydrogen sulphide and ammonia either by a simultaneously or serially treatment with zinc oxide.

The prior art fails to teach entire removal of all impurities in a feed gas stream being a catalyst poison in a subsequent catalytic process for the conversion of the feed gas into chemicals.

OBJECT OF THE INVENTION

The main object of this invention is, thus, to make available a process and system for the removal of trace amounts of a large spectrum of impurities in a feed gas stream, which impurities are poisonous to downstream catalyst compositions.

DETAILED DESCRIPTION OF THE INVENTION

In accordance with the main object, this invention provides a process for the abatement of carbonyl sulphide, metal carbonyls, carbon disulphide, hydrogen sulphide, hydrogen cyanide, ammonia and arsenic and chlorine compounds from a feed gas comprising the steps of contacting the gas in succession with a first purification agent comprising active carbon, with a second purification agent comprising alumina, with a third purification agent comprising zinc oxide, with a fourth purification agent comprising a zeolitic material and a fifth purification agent comprising zinc oxide and copper oxide.

The active carbon is required to remove a part of the poisonous compounds by adsorption from the feed gas prior to contact with the alumina containing purification agent. This is advantageous in several ways. Active carbon is a relatively cheap material and spent material may readily be replaced with fresh active carbon material. Sorption of hydrogen sulphide and ammonia will push the equilibrium of the hydrolysis reactions occurring over the second bed:

$$COS + H_2O = CO_2 + H_2S \qquad (1)$$

$$CS_2 + 2H_2O = CO_2 + H_2S \qquad (2)$$

$$HCN + H_2O = CO + NH_3 \qquad (3)$$

towards right, thereby improving the efficiency of the reactors. Adsorption of the carbonyl compounds on active carbon saves more expensive material for the removal of hydrogen sulphide and arsenic in later beds with the more expensive zinc oxide containing purification agent. Furthermore, the partial absorption of chlorine minimizes the use of specific absorbent in the later beds.

In the second bed, carbonyl sulphide, carbon disulphide and hydrogen cyanide are hydrolysed to hydrogen sulphide and ammonia, respectively over alumina by the equilibrium reactions (1) to (3).

Hydrogen sulphide being formed by the above reactions must be removed in the subsequent bed with the zinc oxide Besides the hydrolysis of the carbonyl and cyanide compounds, chlorine compounds also present in the feed gas are absorbed by the alumina containing purification agent.

The hydrolyzed hydrolysed effluent from the second purification agent is passed to the third zinc containing purification agent for the removal of hydrogen sulfide that is present in the feed gas to the process and which has been formed during hydrolysis in the foregoing treatment as discussed above. Besides hydrogen absorption, the zinc oxide containing purification agent removes remaining amounts of carbonyl sulfide, which have not been hydrolyzed by the above shown equilibrium reaction (1).

Amounts of ammonia being contained in the feed gas at inlet into the first purification agent and being formed in reaction (3) by contact with the second purification agent are adsorbed by contact with the fourth purification agent containing zeolitic material. In general, all acid zeolites are suitable in the abatement of ammonia, including the naturally occurring zeolites like mordenite and clinoptilolite and synthesised zeolites like ZSM-20, ZSM-5 and Y-zeolite.

Arsenic compounds in the feed gas are captured by the fifth purification agent by forming $Cu_3As$ and $Zn_3As_2$.

Besides the above disclosed metal compounds, the purification agents may be promoted with further compounds.

Thus, it is preferred to include between 1 and 40% by weight of potassium carbonate in the second agent. The third agent may contain up 20% by weight of alumina and the fifth agent may contain up to 15% by weight alumina.

As already mentioned hereinbefore, the inventive process is designed for the abatement of trace amounts of poisonous impurities in a synthesis gas. To this end, it should be noted that "abatement" according to the invention means a reduction of the amount of impurities from the ppm region in the feed gas at inlet to first purification agent to the lower ppb region at outlet of the fifth purification agent.

Bulk removal of for instance sulphurous compounds like hydrogen sulphide may in the process according to the invention be performed by means of a conventional wash of the feed gas with a chemical or physical solvent upstream the first purification agent.

The purification agents are preferably arranged as a fixed bed. In case of adsorptive purification, as with beds number 1, 3 and 4, the agent may be arranged in two parallel beds. This allows regeneration of spent agent by desorption of the impurities or replacement of the spent agent with a fresh agent, without interruption of the purification process.

Regeneration of spent purifications agents can be performed by heating, chemical reaction, or by simple replacement.

The invention provides furthermore a system for the abatement of contaminants from synthesis gas comprising in succession a first bed with a purification agent comprising activated carbon, a second bed with a purification agent comprising alumina, a third bed with a purification agent comprising zinc oxide, a fourth bed with a purification agent comprising a zeolitic material and a fifth bed with purification agent comprising zinc oxide and copper oxide.

The function of the various purification agents of the system and content of optional promoters contained in each agent has already been described above.

In the system according to the invention the first, third and fourth bed may be duplicated in form of two parallel beds.

The process and system according to the invention is preferably operated at a temperature of between 200 and 250° C. and a pressure of between 15 and 140 bar, with the exception of the first purification agent in the first bed, which is preferably operated at a temperature of between 20 and 260° C. and at a pressure of up to 140 bar.

What is claimed is:

1. A process for the abatement of carbonyl sulphide, carbon disulphide, metal carbonyl compounds, hydrogen sulphide and hydrogen cyanide, ammonia and arsenic and chlorine compounds from a feed gas comprising the steps of contacting the gas in succession with a first purification agent comprising activated carbon, with a second purification agent comprising alumina, with a third purification agent comprising zinc oxide, with a fourth purification agent comprising a zeolitic material and a fifth purification agent comprising zinc oxide and copper oxide.

2. The process of claim 1, wherein the second purification agent further comprises a potassium carbonate.

3. The process of claim 1, wherein the third purification agent further comprises alumina.

4. The process of claim 1, wherein the fourth purification agent consists of an acidic zeolite.

5. The process of claim 1, wherein the fifth purification agent further comprises alumina.

6. The process according to claim 1, further comprising a washing step with a chemical or physical solvent prior to contacting the gas with the first purification agent.

7. A system for the abatement of contaminants from synthesis gas comprising in succession a first bed with a purification agent comprising activated carbon, a second bed with a purification agent comprising alumina, a third bed with a purification agent comprising zinc oxide, a fourth bed with a purification agent comprising a zeolitic material and a fifth bed with purification agent comprising zinc oxide and copper oxide.

8. The system of claim 7, wherein the second purification agent further comprises a potassium carbonate.

9. The system of claim 7, wherein the third purification agent further comprises alumina.

10. The system of claim 7, wherein the fourth purification agent consists of an acidic zeolite.

11. The system of claim 7, wherein the fifth purification agent further comprises alumina.

12. The system according to claim 7, wherein at least the first third and fourth bed each are arranged in two parallel beds.

* * * * *